United States Patent
Chang et al.

(10) Patent No.: US 6,963,149 B2
(45) Date of Patent: Nov. 8, 2005

(54) RADIAL WINDING STATOR STRUCTURE FOR SINGLE PHASE MOTOR

(75) Inventors: Shun-chen Chang, Taipei (TW); Shih-ming Huang, Hsin Chu (TW)

(73) Assignee: Delta Electronics, Inc., (TW)

( * ) Notice: Subject to any disclaimer, the term of this patent is extended or adjusted under 35 U.S.C. 154(b) by 0 days.

(21) Appl. No.: 10/817,063

(22) Filed: Apr. 1, 2004

(65) Prior Publication Data
US 2004/0232797 A1 Nov. 25, 2004

(30) Foreign Application Priority Data
May 20, 2003 (TW) .............................. 92209214 U

(51) Int. Cl.[7] .......................... H02K 5/12; H02K 17/02
(52) U.S. Cl. .................. 310/67 R; 310/218; 310/259; 360/99.04; 360/99.07; 360/99.08
(58) Field of Search .......................... 310/67 R, 68 B, 310/51, 40 MM, 216, 217, 218, 254, 259, 310/258; 360/99.04, 99.07, 99.08; 29/596–598

(56) References Cited

U.S. PATENT DOCUMENTS 5,220,227 A * 6/1993 Ohi ........................ 310/156.43
6,499,209 B1 * 12/2002 Landin et al. ................. 29/596
6,624,541 B2 9/2003 Horng et al. .................. 310/45
6,700,241 B1 * 3/2004 Horng et al. ............. 310/67 R
6,815,852 B2 * 11/2004 Horng et al. ............. 310/67 R
6,819,068 B2 * 11/2004 Horng et al. ............... 318/254

* cited by examiner

Primary Examiner—Darren Schuberg
Assistant Examiner—Leda Pham
(74) Attorney, Agent, or Firm—Martine Penilla & Gencarella, LLP

(57) ABSTRACT

A radial winding stator structure for a single phase motor is composed of plural silicon steel sheets that are stacked together and have the same structure. Each of the silicon steel sheets includes a hub and six poles. Each pole is radially extended from a circumference of the hub to form a radially extended portion, and tangentially expanded at a terminal of the radially extended portion to form a tangentially extended portion. The hub and the poles are one-piece made, the radially extended portions of each of the poles are stacked to form a pole bobbin of the radial winding stator structure, the tangentially extended portions of each of the poles are stacked to form a pole surface of the radial winding stator structure, and an electrically conductive wire is wound around all of the pole bobbins.

5 Claims, 3 Drawing Sheets

C-C

RADIAL WINDING STATOR STRUCTURE FOR SINGLE PHASE MOTOR

BACKGROUND OF THE INVENTION

1. Field of the Invention

The invention relates to a stator structure for a fan motor with an outer rotor, and more particularly to a radial winding stator structure for a single phase motor.

2. Description of the Related Art

FIGS. 1A and 1B are a top view and an A—A cross-sectional view showing a conventional radial winding stator 1 for a fan motor with an outer rotor, respectively. In the four-pole stator, only the magnetic flux lines of force produced by a permanent magnet (not shown) of the rotor and linked with stator coils that contribute to the rotational torque of the fan motor, so the portions of an electrically conductive wire 2, which is wound around the pole bobbins 12 of the four-pole radial winding stator 1 and protrudes over a pole surface 11 in an axial direction cannot contribute to the rotational torque of the motor. That is, bending portions 21 of the wire cannot contribute to the rotational torque of the motor.

Consequently, with regard to the conventional four-pole radial winding stator 1, when the number of turns of the wound electrically conductive wire 2 is increased in order to provide a larger magnetic force, the ratio of the electrically conductive wire bending portions 21 protruding over two ends of the pole surface 11 in the axial direction to the total electrically conductive wire is getting greater and greater, thereby causing more and more ineffective regions. Consequently, the efficiency of the four-pole radial winding stator structure of the fan motor cannot be effectively improved.

On the other hand, FIG. 1C shows a silicon steel sheet 3 constituting the radial winding stator 1. The silicon steel sheet 3 is composed of a hub 31 and poles 32 extending from the hub 31. Each pole 32 is formed with a bobbin 321 and an end portion 322. The external surface of the end portion 322 is a camber having an arc length S1 determined by θ1 and R1, wherein θ1 denotes an angle of each end portion 322 on the overall circumference, and R1 denotes a distance from a center of the hub 31 to the external surface of the end portion. Please refer to FIGS. 1A to 1C simultaneously. Since the stator is composed of several stacked silicon steel sheets 3, the space occupied by the bending portions 21 in the axial direction in the overall stator is getting larger as the bending portions 21 of the electrically conductive wire protruding over two ends of the pole surface 11 are getting more, thereby adversely influencing the number of silicon steel sheets that may be stacked within a fixed height H of the stator. Consequently, the magnetic flux lines of force of the permanent magnet (not shown) of the rotor cannot be completely conducted.

Also, in a fan motor structure, there is a settled limitation to the height of the radial winding stator. With regard to the conventional four-pole radial winding stator 1, the number of silicon steel sheets can not be further increased because the bending portions 21 of the electrically conductive wire protruding over two ends of the pole surface 11 in the axial direction are too large. For example, in FIG. 1B, the height L1 of the silicon steel sheets and the heights x of the electrically conductive wire protruding over two ends of the pole surface 11 are limited by the threshold height H of the stator. Thus, it is impossible to enhance the efficiency of the fan by increasing the number of silicon steel sheets.

SUMMARY OF THE INVENTION

In a conventional four-pole radial winding stator structure, since the ratio of the electrically conductive wire winding portions protruding over two ends of the poles in the axial direction to the overall winding portions is increased, the effective lines of magnetic force is decreased and the number of silicon steel sheets for forming the poles cannot be further increased, and the efficiency of the fan motor cannot be enhanced.

To solve this problem, the invention provides a radial winding stator structure having a plurality of poles, a number of which is greater than four. The experimental result can prove that the radial winding stator structure according to the embodiment of the invention can provide more than 20% efficiency to the conventional fan having the four-pole stator structure and the same dimension as that of the invention.

An object of the invention is to provide a radial winding stator structure for a single phase motor, wherein the number of poles of the stator structure is greater than four and is preferably six or eight, and the ratio of the wire protruding over two ends of each pole to the entire wire is smaller such that the effective flux lines of magnetic force may be increased. The total number of turns of the electrically conductive wire that can be wound is made greater so that the efficiency of the fan motor may be effectively enhanced. The total thickness of the silicon steel sheets of each pole is made greater so that the number of flux lines of magnetic force may be effectively increased.

A radial winding stator structure for a single phase motor according to an embodiment of the invention is composed of plural stacked silicon steel sheets having the same structure. Each of the silicon steel sheets includes a hub and six poles. The poles and the hub are one-piece made, and each of the poles is radially extended from a circumference of the hub to form a radially extended portion, and tangentially expanded at a terminal of the radially extended portion to form a tangentially extended portion. The radially extended portions of each of the poles are stacked to form a pole bobbin of the radial winding stator structure, the tangentially extended portions of each of the poles are stacked to form a pole surface of the radial winding stator, and an electrically conductive wire is wound around all of the pole bobbins.

A radial winding stator structure for a single phase motor according to another embodiment of the invention is composed of plural stacked silicon steel sheets having the same structure. Each of the silicon steel sheets includes a hub and eight poles. The hub and the poles are one-piece made, and each of the poles is radially extend from a circumference of the hub to form a radially extended portion, and tangentially expanded at a terminal of the radially extended portion to form a tangentially extended portion. The radially extended portions of each of the poles are stacked to form a pole bobbin of the radial winding stator structure, the tangentially extended portions of each of the poles are stacked to form a pole surface of the radial winding stator structure, and an electrically conductive wire is wound around the pole bobbins.

The invention has the following advantages. First, since the number of poles of the invention is greater, the electrically conductive wire that needs to be wound around each pole bobbin may be reduced naturally. Correspondingly, portions of the electrically conductive wire protruding over two ends of the pole surface in the axial direction may be reduced naturally. Second, each pole section area of this invention is naturally reduced owing to the increase of the number of poles. Thus, the number of turns of the electrically conductive wire that can be wound around each pole bobbin is greater than that for the conventional four-pole stator structure. Third, since the dimension of each electrically conductive wire protruding over two ends of the pole surface in the axial direction is naturally reduced in this invention, the total thickness of stackable silicon steel sheets is greater than that of the conventional four-pole stator structure, and the efficiency of the fan motor may be enhanced.

DETAILED DESCRIPTION OF THE INVENTION

Figure 2A:
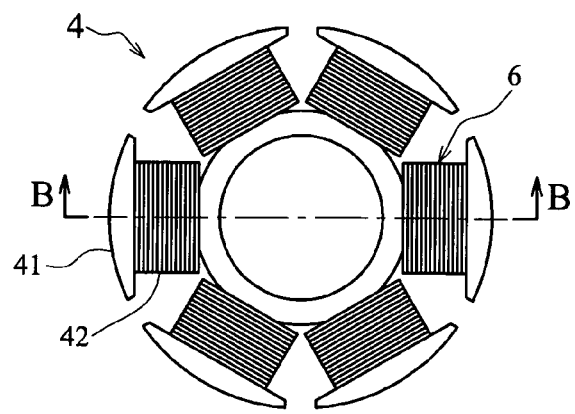
FIG. 2A is a top view showing a six-pole radial winding stator for a fan motor according to a first embodiment of the invention.
Figure 2B:
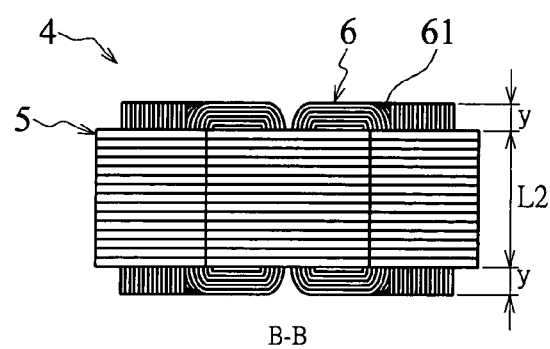
FIG. 2B is a cross-sectional view taken along a line B—B of FIG. 2A to show the six-pole radial winding stator for the fan motor according to the first embodiment of the invention.
Figure 2C:
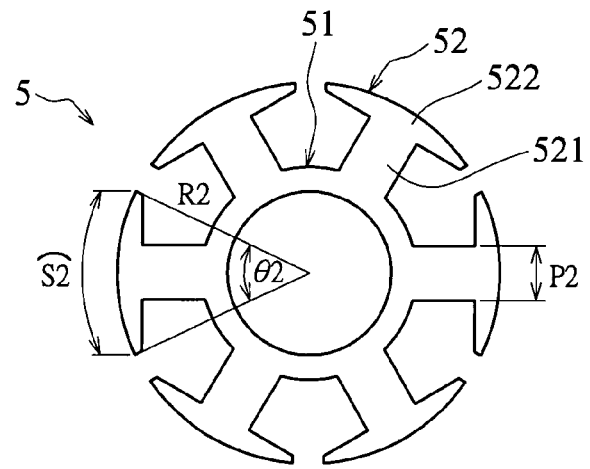
FIG. 2C is a top view showing a silicon steel sheet structure constituting the six-pole radial winding stator for the fan motor according to the embodiment of the invention.

Please refer next to FIGS. 2A and 2B, which are a top view and a B—B cross-sectional view showing a radial winding stator structure 4 for a fan motor (single phase motor) according to a first embodiment of the invention. The radial winding stator structure 4 of this embodiment is composed of a plurality of silicon steel sheets 5 stacked together. As shown in FIG. 2C, each silicon steel sheet 5 is one-piece made into a hub 51 and six poles 52. The hub 51 is formed with a through hole at a center thereof. Each pole 52 is radially extended from a circumference of the hub 51 and is tangentially expanded at a terminal thereof. It is to be noted that an external side surface of a tangentially extended portion 522 of each pole 52 is a camber having an arc length S2 determined by an angle θ2 occupied by the tangentially extended portion 522 of each pole 52 and a distance R2 from an arbitrary end of the portion 522 to a hub center.

Figure 1A:
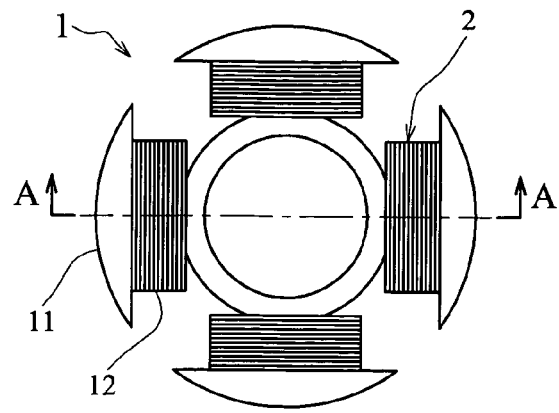
FIG. 1A is a top view showing a conventional four-pole radial winding stator for a fan motor with an outer rotor.

In this embodiment, since the number of the poles 52 is six, the angle θ2 is smaller than or equal to 60 degrees (i.e., π/3). Comparing with the conventional four-pole stator structure 1 of FIG. 1A, the present embodiment has a S2 that is inevitably smaller than S1 for that θ2 is inevitably smaller than θ1 under the same condition that the distances from the hub centers to the pole surfaces are the same (R1=R2). On the other hand, as shown in FIGS. 2A and 2B, after the silicon steel sheets 5 are stacked and reach a height L2, the radially extended portions 521 of the overlapped poles 52 form pole bobbins 42 around which the electrically conductive wire 6 is wound. External side surfaces of the tangentially extended portions 522 of each of the poles 52 are overlapped to form a pole surface 41. The height of the pole surface 41 is determined by the number of the stacked silicon steel sheets 5. That is, the height L2 of the stacked silicon steel sheets 5 equals to the height of the pole surface 41.

Figure 1B:
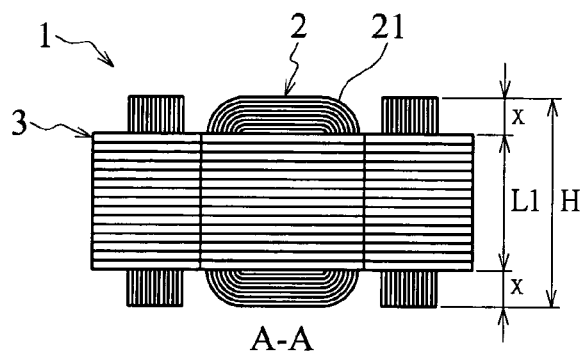
FIG. 1B is a cross-sectional view taken along a line A—A of FIG. 1A to show the conventional four-pole radial winding stator for the fan motor with the outer rotor.

Please refer to FIGS. 2B and 1B simultaneously. When the height L2 of the silicon steel sheets of the six-pole radial winding stator structure 4 of this embodiment is the same as the height L1 of the silicon steel sheets of the conventional four-pole radial winding stator structure 1, the following results may be obtained by comparing the radial winding stator structure of this embodiment with that of the prior art.

Figure 1C:
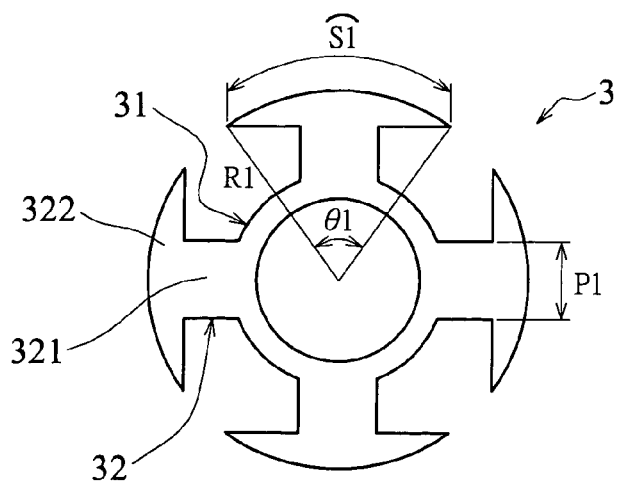
FIG. 1C is a top view showing a silicon steel sheet structure constituting the conventional four-pole radial winding stator for the fan motor.

First, when two electrically conductive wires having the same length are wound around the radial winding stator structure 4 of this embodiment and the conventional radial winding stator structure 1, respectively, the electrically conductive wire 6 wound around each pole bobbin 42 is naturally shortened since the number of poles of this embodiment is increased. Correspondingly, the dimension y of each of the portions 61 of the electrically conductive wire protruding over two ends of the pole surface 41 in the axial direction is also naturally decreased. In other words, "y" of FIG. 2B is smaller than "x" of FIG. 1B. Second, each pole bobbin 42 becomes thin owing to the increase of number of poles in this embodiment. That is, P2 of FIG. 2C is smaller than P1 of FIG. 1C. Therefore, the number of turns of the electrically conductive wire that may be wound around each pole bobbin 42 is greater than that in the conventional four-pole stator structure. Third, effective portions of the magnetic lines of force induced by the electrically conductive wire 6 and crossed with each pole surface 41 are increased owing to the increase of the number of poles.

In addition, as shown in FIG. 2B of this embodiment, since the coil portions 61 protruding over two ends of the pole surface 41 of the stator structure in the axial direction have been decreased (i.e., y<x), the sum of the total height L2 of the silicon steel sheets of the stator structure of this embodiment and the height 2y of the protrusions does not reach an upper height limit H. In this case, it is possible to further stack some silicon steel sheets to make the total thickness (or the total number of silicon steel sheets) of the six-pole stator structure of this embodiment greater than the total thickness of the conventional four-pole stator structure (or the total number of silicon steel sheets) so as to enhance the efficiency of the fan motor.

It is to be noted that in order to enhance the efficiency of the fan motor more effectively, a ratio of the arc length S2 of the external side surface of the tangentially extended portion 522 of each pole 52 or the arc length S2 of each pole surface 41 to the height L2 of the stacked silicon steel sheets in this embodiment is restricted and ranges from 0.8 to 2.

Figure 3A:
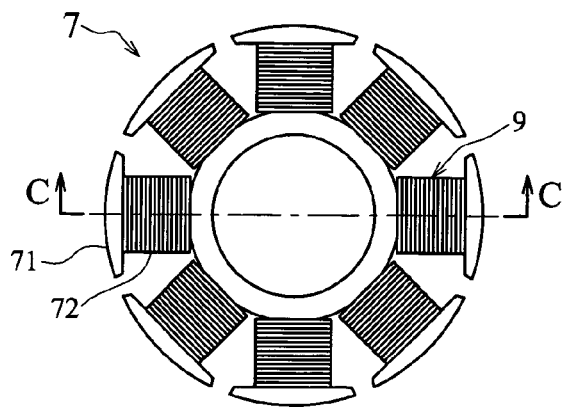
FIG. 3A is a top view showing an eight-pole radial winding stator for a fan motor according to a second embodiment of the invention.
Figure 3B:
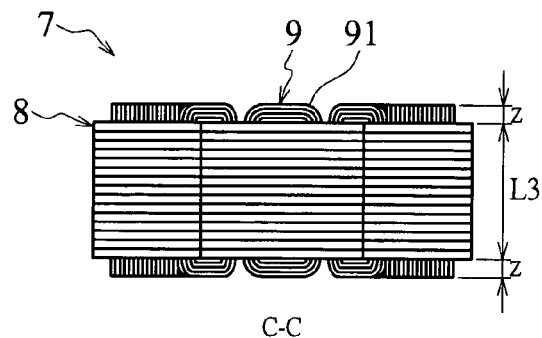
FIG. 3B is a cross-sectional view taken along a line B—B of FIG. 3A to show the eight-pole radial winding stator for the fan motor according to the second embodiment of the invention.
Figure 3C:
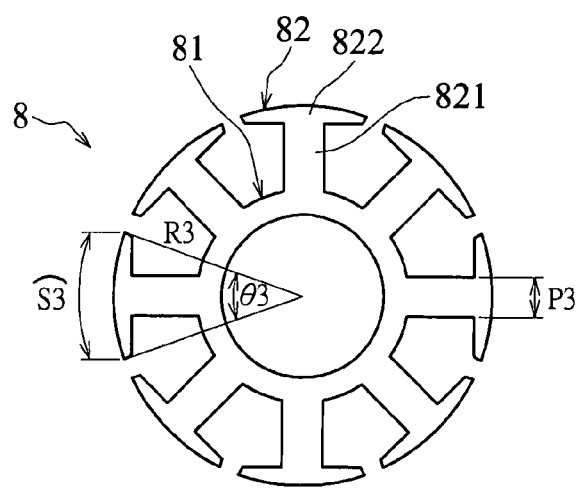
FIG. 3C is a top view showing a silicon steel sheet structure constituting the eight-pole radial winding stator for the fan motor according to the second embodiment of the invention.

Please refer next to FIGS. 3A and 3B, which are a top view and a C—C cross-sectional view showing a radial winding stator structure 7 for a fan motor (single phase motor) according to a second embodiment of the invention. The radial winding stator structure 7 of this embodiment is composed of a plurality of silicon steel sheets 8 stacked together. As shown in FIG. 3C, each silicon steel sheet 8 is one-piece made into a hub 81 and eight poles 82. The hub 81 is formed with a through hole at a center thereof, and each pole 82 is radially extended from a circumference of the hub 81 and is tangentially expanded at a terminal thereof It is to be noted that an external side surface of a tangentially extended portion 822 of each pole 82 is a camber having an arc length S3 determined by an angle θ3 occupied by the tangentially extended portion 822 of each pole 82 and a distance R3 from an arbitrary end of the portion 822 to a hub center.

In this embodiment, since the number of poles 82 is eight, the angle θ3 is smaller than or equal to 45 degrees (i.e., π/4). Comparing with the conventional four-pole stator structure 1 of FIG. 1A, the present embodiment has a S3 that is inevitably smaller than S1 for that θ3 is inevitably smaller than θ1 under the same condition that the distances from the hub centers to the pole surfaces are the same (R1=R3). On the other hand, as shown in FIGS. 3A and 3B, after the silicon steel sheets 8 are stacked and reach a height L3, the radially extended portions 821 of the overlapped poles 82 form pole bobbins 72 around which the electrically conductive wire 9 is wound. External side surfaces of the tangentially extended portions 822 of each of the poles 82 are overlapped to form a pole surface 71. The height of the pole surface 71 is determined by the number of stacked silicon steel sheets 8. That is, the height L3 of the stacked silicon steel sheets 8 equals to the height of the pole surface 71.

Please refer to FIGS. 3B, 2B and 1B simultaneously. When the height L3 of the silicon steel sheets of the eight-pole radial winding stator structure 7 of the second embodiment is the same as the height L2 of the silicon steel sheets of the six-pole radial winding stator structure 4 of the second embodiment as well as the height L1 of the silicon steel sheets of the conventional four-pole radial winding stator structure 1, the following results may be obtained. First, when two electrically conductive wires having the same length are wound around the pole bobbins of the stator structures, respectively, the electrically conductive wire 9 wound around each pole bobbin 72 is shorter than that of the first embodiment or the prior art since the number of poles of the second embodiment is greater. Correspondingly, the dimension z of each of the portions 91 of the electrically conductive wire protruding over two ends of the pole surface 71 in the axial direction is also smaller than y and x (i.e., z<y<x). Second, each pole bobbin 72 becomes thin owing to the increase of number of poles in this embodiment. That is, P3<P2<P1. Therefore, the number of turns of the electrically conductive wire that may be wound around each pole bobbin 72 is greater than that in the conventional four-pole stator structure. Third, effective portions of the magnetic lines of force induced by the electrically conductive wire 9 and crossed with each pole surface 71 are increased owing to the increase of the number of poles.

In addition, as shown in FIG. 3B of this embodiment, since the coil portions protruding over two ends of the pole surface 71 of the stator structure in the axial direction have been decreased, the sum of the total height L3 of the silicon steel sheets of the stator structure of this embodiment and the height 2z of the protrusions does not reach an upper height limit H. In this case, compare the present embodiment with the first one, it is possible to further stack some silicon steel sheets to make the total thickness (or the total number of silicon steel sheets) of the eight-pole stator structure of this embodiment greater than the total thickness of the conventional four-pole stator structure (or the total number of silicon steel sheets) so as to enhance the efficiency of the fan motor.

It is to be noted that in order to enhance the efficiency of the fan motor more effectively, a ratio of the arc length S3 of the external side surface of the tangentially extended portion 822 of each pole 82 or the arc length S3 of each pole surface 71 to the height L3 of the stacked silicon steel sheets in this embodiment is restricted and ranges from 0.8 to 2.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A radial winding stator structure for a single phase motor, the radial winding stator structure being composed of a plurality of silicon steel sheets that are stacked together, each of the silicon steel sheets comprising:
    a hub; and
    a plurality of poles numbering six or eight, each of which being radially extended from a circumference of the hub to form a radially extended portion, and tangentially expanded at a terminal of the radially extended portion to form a tangentially extended portion;
    wherein the hub and the poles are one-piecemade, the radially extended portions of each of the poles are stacked to form a pole bobbin of the radial winding stator structure, the tangentially extended portions of each of the poles are stacked to form a pole surface of the radial winding stator structure, an electrically conductive wire is wound around all of the pole bobbins, and a ratio of an arc length of the pole surface to an axial height of the pole surface substantially ranges from 0.8 to 2.

2. The radial winding stator structure according to claim 1, wherein the pole surface is a camber.

3. The radial winding stator structure according to claim 1, wherein the hub is formed with a through hole at a center thereof.

4. A radial winding stator structure for a fan motor, the radial winding stator structure being composed of a plurality of silicon steel sheets that are aligned and stacked together, the stator structure comprising:
    a hub; and
    a plurality of poles numbering six or eight located on a circumference of the hub, each of the poles radially extended from the hub and stacked together to form a pole bobbin with a pole surface tangentially expanded;
    wherein an electrically conductive wire is wound around each pole bobbin, and a ratio of an arc length of the pole surface to an axial height of the pole surface substantially ranges from 0.8 to 2.

5. A radial winding stator structure for a fan motor, comprising a plurality of silicon steel sheets stacked together, each of which comprising:
    a hub; and
    a plurality of poles located on a circumference of the hub, each of the pole comprising a first extended portion radially extended from the hub, and a second extended portion circumferentially extended from a terminal of the first extended portion;
    wherein the first extended portions of each of the poles are stacked to form a pole bobbin around which an electrically conductive wire is wound, the second extended portions of each of the poles are stacked to form a pole surface of the radial winding stator structure, and a ratio of an arc length of the pole surface to an axial height of the pole surface substantially ranges from 0.8 to 2.

* * * * *